United States Patent
Chen et al.

(10) Patent No.: US 8,861,964 B2
(45) Date of Patent: Oct. 14, 2014

(54) METHODS AND ARRANGEMENTS IN OPTICAL NETWORK

(75) Inventors: Ling Chen, Beijing (CN); Shuyou Dong, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 163 days.

(21) Appl. No.: 13/583,971

(22) PCT Filed: Mar. 29, 2010

(86) PCT No.: PCT/CN2010/000389
§ 371 (c)(1),
(2), (4) Date: Sep. 11, 2012

(87) PCT Pub. No.: WO2011/120185
PCT Pub. Date: Oct. 6, 2011

(65) Prior Publication Data
US 2013/0004160 A1    Jan. 3, 2013

(51) Int. Cl.
*H04B 17/00* (2006.01)
*H04J 14/00* (2006.01)
*H04J 3/06* (2006.01)
*H04Q 11/00* (2006.01)

(52) U.S. Cl.
CPC ... *H04Q 11/0067* (2013.01); *H04Q 2011/0079* (2013.01); *H04J 3/0655* (2013.01)
USPC .................................. 398/72; 398/25; 398/71

(58) Field of Classification Search
USPC ............. 398/25, 58, 66–68, 70–72, 125, 154, 398/155
See application file for complete search history.

(56) References Cited

U.S. PATENT DOCUMENTS

| | | | |
|---|---|---|---|
| 2002/0171895 A1* | 11/2002 | Chang | 359/168 |
| 2009/0196606 A1* | 8/2009 | Miyagi et al. | 398/45 |
| 2009/0297164 A1 | 12/2009 | Horiuchi | |
| 2010/0098407 A1* | 4/2010 | Goswami et al. | 398/5 |
| 2014/0044441 A1* | 2/2014 | Hirth et al. | 398/209 |

OTHER PUBLICATIONS

ITU-T Recommendation G.984.3 Gigabit-capable Passive Optical Networks (G PON): Transmission convergence layer specification. Mar. 2008.
ITU-T Recommendation G.984.3 (Mar. 2008) Gigabit-capable Passive Optical Networks (G PON): Transmission convergence layer specification Amendment 2; Geneva, May 2009.
ITU-T G.984.4. Gigabit-capable Passive Optical Networks (G PON): ONT Management and Control Interface Specification. Feb. 2008.
ITU-T G.984.4. (2008) Amendment 2 Gigabit-capable Passive Optical Networks (G PON): ONT Management and Control Interface Specification. Geneva, May 2009. Revised Jul. 22, 2009.

* cited by examiner

*Primary Examiner* — Dalzid Singh

(57) ABSTRACT

Methods and arrangements for time distribution in an optical network system in the upstream direction. The information of a selected time reference frame and a calculated time stamp value of the frame based on a real-time clock of the optical line terminal (OLT) is sent from the OLT to the optical network unit (ONU) via the optical distribution network (ODN). When the time reference frame is sent to the ONU from the OLT via the ODN, the ONU records the arrival time of the frame based on a time reference made by the real-time clock of the ONU. The time difference between the arrival time and the time stamp value is calculated whereupon the OLT is informed of the calculated time difference. The OLT adjusts the real-time clock of the OLT in accordance with the time difference.

18 Claims, 5 Drawing Sheets

METHODS AND ARRANGEMENTS IN OPTICAL NETWORK

TECHNICAL FIELD

The present invention relates to methods and arrangements for time distribution in an optical network system, and in particular to time distribution within Passive Optical Network (PON), such as Gigabit-capable Passive Optical Network (GPON).

BACKGROUND

In a hierarchical mobile telecommunications network the backhaul portion of the network comprises the intermediate links between the core network of the network and the small subnetworks at the edge of the entire hierarchical network. For example, while user equipments communicating with a base station constitute a local subnetwork, the connection between the base station and the rest of the world begins with a backhaul link to the core of the telecommunication supplier's network. Optical networks such as GPON, which provides multiple access methods, are suitable mobile backhaul solutions referred to as GPON Radio Access Networks (GPON RAN).

In a GPON RAN the Cellular Backhaul Unit (CBU) collects and distributes all kinds of traffic from the base station. Typical interface types include Ethernet (for data service) and E1/T1 (TDM for voice service). The optical line terminal (OLT) and the optical distribution Network (ODN) comprised in the GPON aggregate traffic from the Optical Network Units (ONU) (i.e. the CBUs) to the core network of the telecommunication supplier.

One of the important functions in the GPON RAN is the distribution of the real-time clock information from the core network to the base station over the GPON backhaul portion.

A prior art solution for distribution of Time-of-Day (ToD) in a GPON system is a method wherein a transaction is defined in the transmission convergence layer and a Management Entity is introduced in the management layer. The method can provide less than 1 µs phase accuracy which is adequate for mobile backhaul applications. The mentioned method and other prior art methods utilizes the real-time clock source of the OLT to adjust the real-time clock of the ONU. Hence, the prior art methods only work in the downstream direction i.e. when the time is distributed from the OLT to the ONU.

In current cellular communications network such as the CDMA based cellular network, the OLT and the base station could be geographically separated. For example, a Metropolitan Area Network (MAN) could be connected between the OLT and the base station which make the acquiring of a real-time clock source with OLT either difficult or expensive e.g. if installation of a new GPS/BITS (Global Positioning System/Building Integrated Timing Supply) is needed.

SUMMARY

It is therefore an object of the present invention to provide methods and arrangements for time distribution in upstream direction (i.e. the time is distributed from the ONU to the OLT).

The above stated object is achieved by means of a method and an arrangement according to the independent claims.

In accordance with a first aspect of the present invention a method in an optical network unit (ONU) for time distribution in an optical network system is provided. The optical network system further comprises an optical line terminal (OLT). The method comprises the step of receiving information of a selected time reference frame and a time stamp value of the time reference frame from the OLT. The time reference frame is then received from the OLT, whereupon the ONU records an arrival time stamp value of the time reference frame made by a real-time clock of the ONU. The method further comprises the step of calculating a time difference between the arrival time stamp value and the received time stamp value of the time reference frame. Finally the ONU informs the OLT of the time difference.

In accordance with a second aspect of the present invention an arrangement in an optical network unit (ONU) for time distribution is provided. The arrangement is adapted to be comprised in an optical network system, which further comprises an optical line terminal (OLT). The arrangement comprises a receiver configured to receive information of a selected time reference frame and a time stamp of the time reference frame from the OLT. It further comprises a receiver configured to receive the time reference frame from the OLT and a recording unit configured to record an arrival time stamp value of the time reference frame made by a real-time clock of the ONU. A calculating unit configured to calculate a time difference between the arrival time stamp value and the received time stamp value of the time reference frame is also comprised in the arrangement. Additionally, an informing unit configured to inform the OLT of the time difference is comprised in the arrangement.

In accordance with a third aspect of the present invention a method in an optical line terminal (OLT) for time distribution in an optical network system is provided. The optical network system further comprises an optical network unit (ONU). The method comprises the steps of selecting a downstream frame as a time reference frame and calculating a time stamp value of the time reference frame based on a time reference of a real-time clock of the OLT. A step of informing the ONU of the time reference frame and the time stamp value is comprised in the method. Moreover, the method comprises the steps of sending the time reference frame to the ONU and receiving information of a time difference between an arrival time stamp value of the frame in the ONU made by a real-time clock of the ONU and the time stamp value from the ONU. Additionally, the method comprises the step of adjusting the real-time clock of the OLT based on the received time difference.

In accordance with a fourth aspect of the present invention an arrangement in an optical line terminal (OLT) for time distribution is provided. The arrangement is adapted to be comprised in an optical network system which further comprises an optical network unit (ONU). The arrangement comprises a selecting unit configured to select a downstream frame as a time reference frame and a calculating unit configured to calculate a time stamp value of the time reference frame based on a time reference of a real-time clock of the OLT. Moreover, the arrangement comprises an informing unit configured to inform the ONU of the time reference frame and the time stamp value. A transmitter configured to send the time reference frame to the ONU is also comprised in the arrangement. Additionally, the arrangement comprises a receiver configured to receive information of a time difference between an arrival time stamp value of the frame in the ONU made by a real-time clock of the ONU and the time stamp value from the ONU and an adjusting unit configured to adjust the real-time clock of the OLT based on the received time difference.

An advantage of embodiments of the present invention is that they provide a possibility to distribute time in a GPON mobile backhaul in an upstream direction.

Another advantage of embodiments of the present invention is that they provide the possibility to send Time-of-Day information from the ONU to the OLT with phase synchronization accuracy less than 1 µs.

Another advantage of embodiments of the present invention is that the widely deployed GPS/BITS equipments at base stations can be directly reused in the GPON mobile backhaul.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

Figure 1:
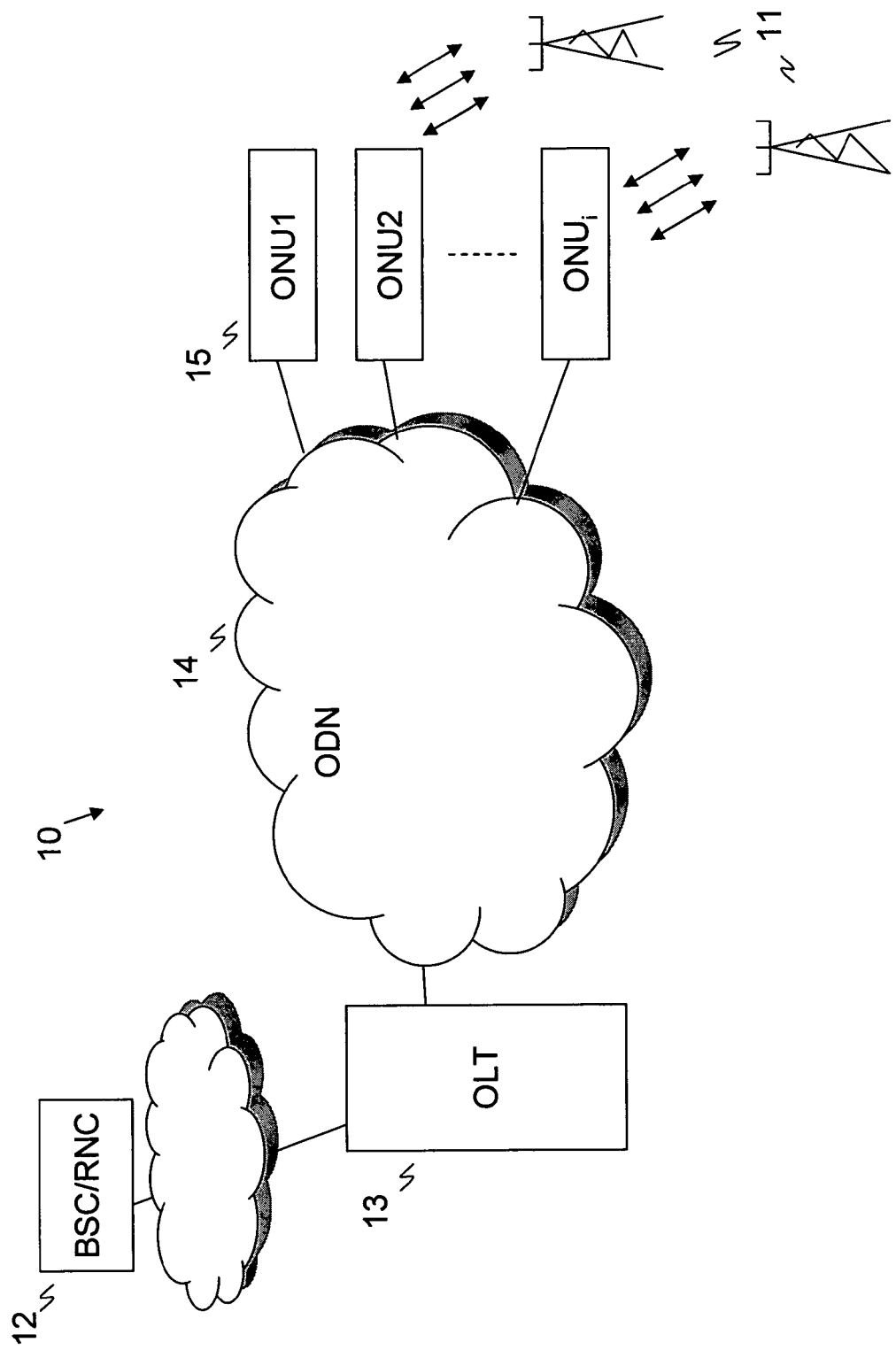
FIG. 1 illustrates schematically a GPON as a mobile backhaul solution comprising an OLT, ODN and several ONUs wherein the present invention may be implemented.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to a Gigabit-capable Passive Optical Network (GPON). It should though be noted that the invention and its exemplary embodiments may also be applied in all synchronous PON systems.

In current cellular communications network such as the CDMA based cellular network many user equipments and almost all base stations are equipped with a real-time clock source such as a GPS/BITS (Global Positioning System/Building Integrated Timing Supply). A closer look into the topology of GPON mobile backhaul solution reveals that the ONU (i.e. the cellular backhaul unit) is most commonly physically installed together with the base station. Thus, the ONU has access to a real-time clock source such as the GPS/BITS of the base station. In should however be understood that in cases wherein the ONU does not have access to a real-time clock source of a base station i.e. an external clock source, it could be equipped with an internal clock source, e.g. a GPS box or a real-time clock hardware could be embedded in the ONU.

FIG. 1 illustrates a GPON as a mobile backhaul solution. The optical network 10 transports traffic between the base stations 11 and the base station controller 12. The optical network 10 comprises an optical line terminal (OLT) 13, optical distribution network (ODN) 14 and several optical network units (ONU1, ONU2 . . . ONUi) 15 wherein the present invention may be implemented. The present invention provides methods and arrangement for time distribution in upstream direction (i.e. the time is distributed from the ONU 15 to the OLT 13) in the passive optical network.

According to the basic concept of the present invention, information of a selected time reference frame and of a calculated time stamp value of the frame based on a real-time clock of the OLT 13 is sent from the OLT 13 to the ONU 15 via the ODN 14. The information is recorded in the ONU 15. When the time reference frame is sent to the ONU 15 from the OLT 13 via the ODN 14, the ONU 15 records the arrival time of the frame based on a time reference made by the real-time clock of the ONU 15. The time difference between the arrival time and the time stamp value is calculated whereupon the OLT 13 is informed of the calculated time difference. The OLT 13 adjusts the real-time clock of the OLT 13 in accordance with the time difference.

Figure 2:
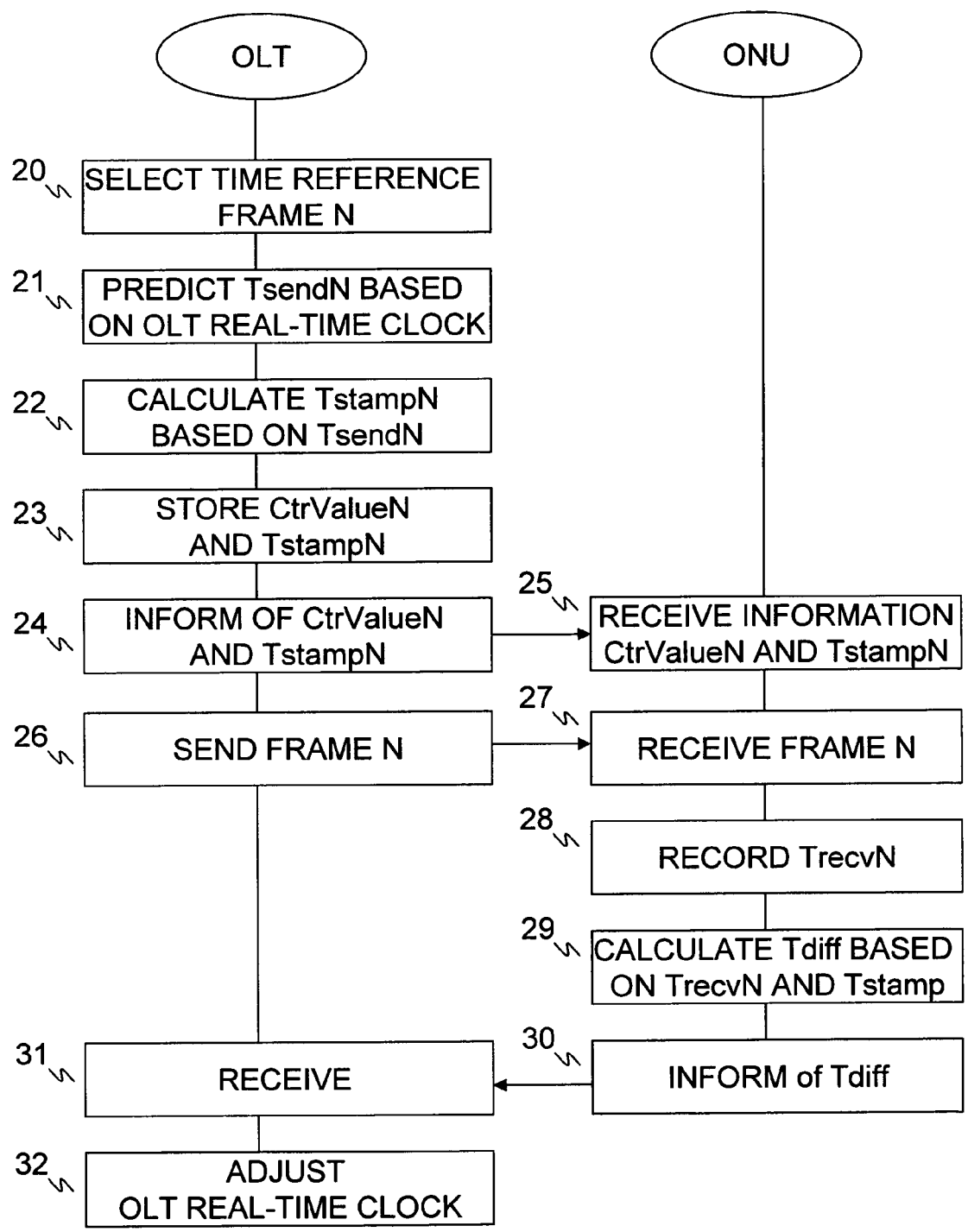
FIG. 2 is a flowchart of the methods according to embodiments of the present invention performed in the OLT and the ONU.

FIG. 2 shows a flowchart of the methods in the OLT 13 and the ONU 15 according to an embodiment of the present invention. In a step 20, the OLT selects a downstream frame N that will be used as the time reference frame. The time reference frame N contains a frame counter field.

It should be mentioned that the procedure of selecting a time reference frame could be performed at different time intervals e.g. at every 24 hours in networks wherein the frame counter rolls over every 37 hours. The time reference frame selecting procedure could also be performed whenever a new ONU has been activated in the GPON.

In a next step 21, the OLT predicts the exact time-of-day at which the first bit of the time reference frame N departs from the OLT, $Tsend_N$. The departure of the bit is defined to be when the optical signal representing the bit crosses an optical connector or splice that is the boundary between the OLT and the ODN. The time-of-day is based on a time reference of the real-time clock source of the OLT. The OLT then calculates a time stamp value, $Tstamp_N$, which is based on the predicted $Tsend_N$ of frame N in step 22.

The time stamp value $Tstamp_N$ refers to the exact time-of-day that the first bit of the time reference frame N arrives at a hypothetical ONU that has an equalization delay of zero and a response time of zero. The arrival of the bit at the ONU is defined to be when the optical signal representing the bit crosses the optical connector or splice that is the boundary between the ODN and the ONU.

The calculation is given by:

$$T\text{stamp}_N = T\text{send}_N + \Delta_{OLT}, \text{ where}$$

$$\Delta_{OLT} = Teqd \frac{n_{1490}}{n_{1310} + n_{1490}}$$

The zero distance equalization delay, Teqd, is equal to the offset between the downstream and upstream frames at the OLT location. The OLT adjusts the equalization delay of each ONU such that, for all ONUs, the start of the upstream frame at the OLT occurs Teqd seconds after the start of the downstream frame. $n_{1310}$ is the index of refraction for 1310 nm wavelength light in the ODN and $n_{1490}$ is the index of refraction for 1490 nm wavelength light in the ODN. Note that the above values are all references to the optical interface, and the OLT is responsible for compensating for all its internal delays.

Next, in step 23, the time stamp value $T\text{stamp}_N$ and an actual frame counter value of the frame counter field in the time reference frame N, $CtrValue_N$, are stored locally at the OLT. Further, the OLT informs one or more ONUs of the selected time reference frame i.e. the actual frame counter value $CtrValue_N$ and the time stamp value $T\text{stamp}_N$ in a step 24. This could in one embodiment be executed by sending the values via the ONU Management and Control Interface (OMCI). In a step 25, the ONU receives the time stamp value $T\text{stamp}_N$ and the frame counter value $CtrValue_N$.

Next, the OLT sends the downstream time reference frame N to the ONU in a step 26. The ONU receives the time reference frame N, in step 27 and thereupon it records the arrival time of the frame, $Trecv_N$ in a step 28. The arrival time of the frame is based on a time reference based on the real-time clock source of the ONU. The arrival time of the frame, $Trecv_N$, is the exact time-of-day at which the first bit of the time reference frame N arrives at the ONU. The arrival of the optical signal at the ONU is defined to be when the optical signal representing the bit crosses the optical connector or splice that is the boundary between the ODN and the ONU.

Moreover, in a step 29, the ONU calculates the time difference between the arrival time of frame N and the time stamp value which is given by:

$$T_{diff} = Trecv_N - T\text{stamp}_N$$

Then the ONU informs the OLT of the calculated time difference $T_{diff}$ in a step 30. The OLT receives the calculated time difference in a step 31. In a next step 32, the OLT adjusts the real-time clock of the OLT in accordance with the received time difference.

Figure 3:
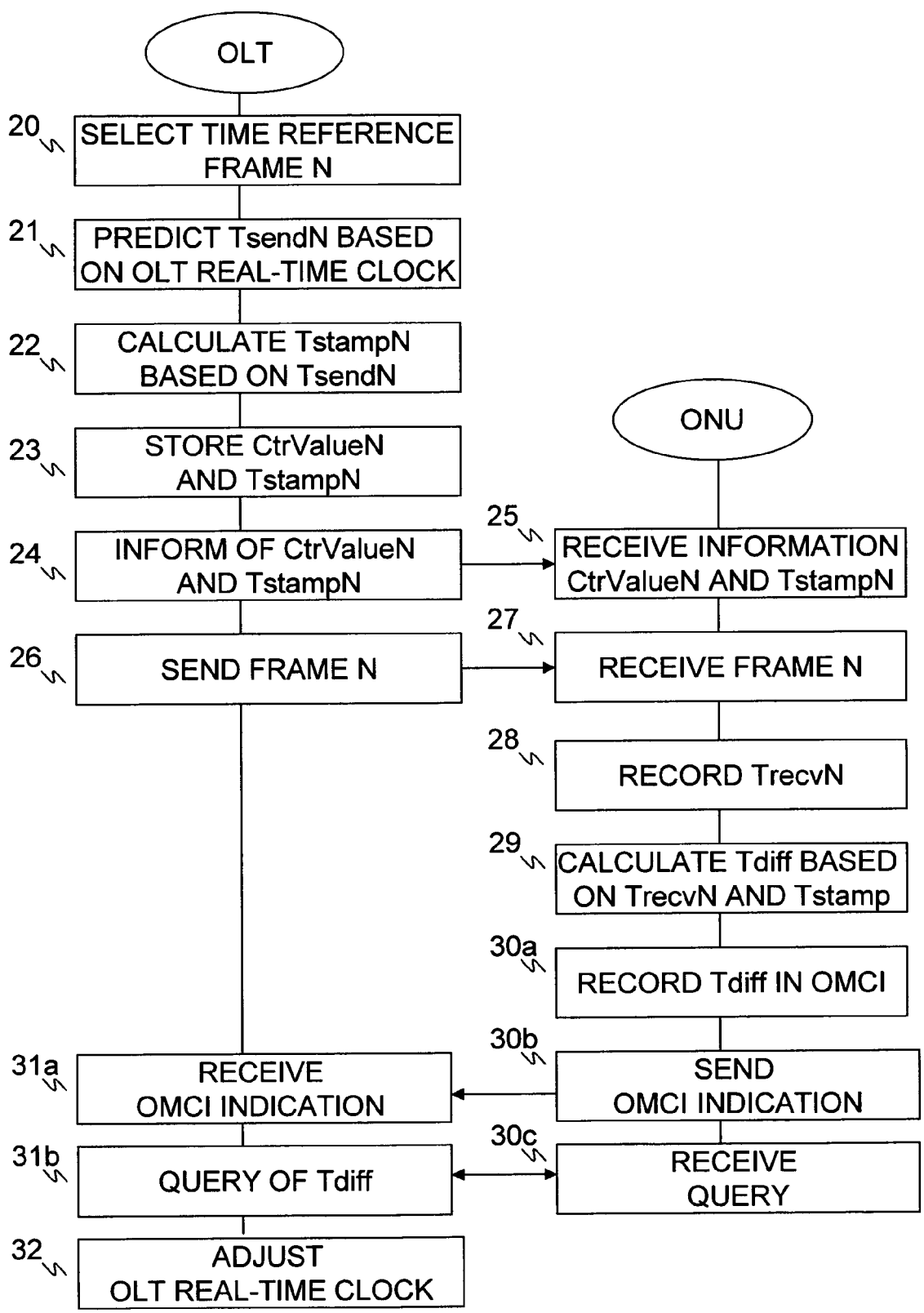
FIG. 3 is a flowchart of the methods according to embodiments of the present invention performed in the OLT and the ONU wherein the time difference is recorded in the OMCI.

In embodiments of the present invention of which the flow chart is illustrated in FIG. 3, the step of informing 30 the OLT of the calculated time difference $T_{diff}$ comprises a step of recording 30a the time difference in the OMCI management information base (OMCI MIB). The ONU sends in step 30b an OMCI indication, such as an Attribute Value Change (AVC) to the OLT, indicating that the time difference parameter is recorded in OMCI MIB and ready for reading. The OLT receives in a step 31a the OMCI indication, e.g. the AVC, and queries 31b the OMCI MIB of the ONU about the time difference $T_{diff}$ parameter. The ONU receives the query in a step 30c.

It should also be mentioned that in order to trace all possible modifications of the real-time clock of the ONU, the ONU can be set to trigger the OMCI AVC event whenever $T_{diff}$ is changed. For example, if the ONU has lost the external clock source and is running in a free mode, the external clock recovers. In this case the ONU shall adjust its real-time clock. The OLT shall handle this event by adjusting its real-time clock accordingly.

Figure 4:
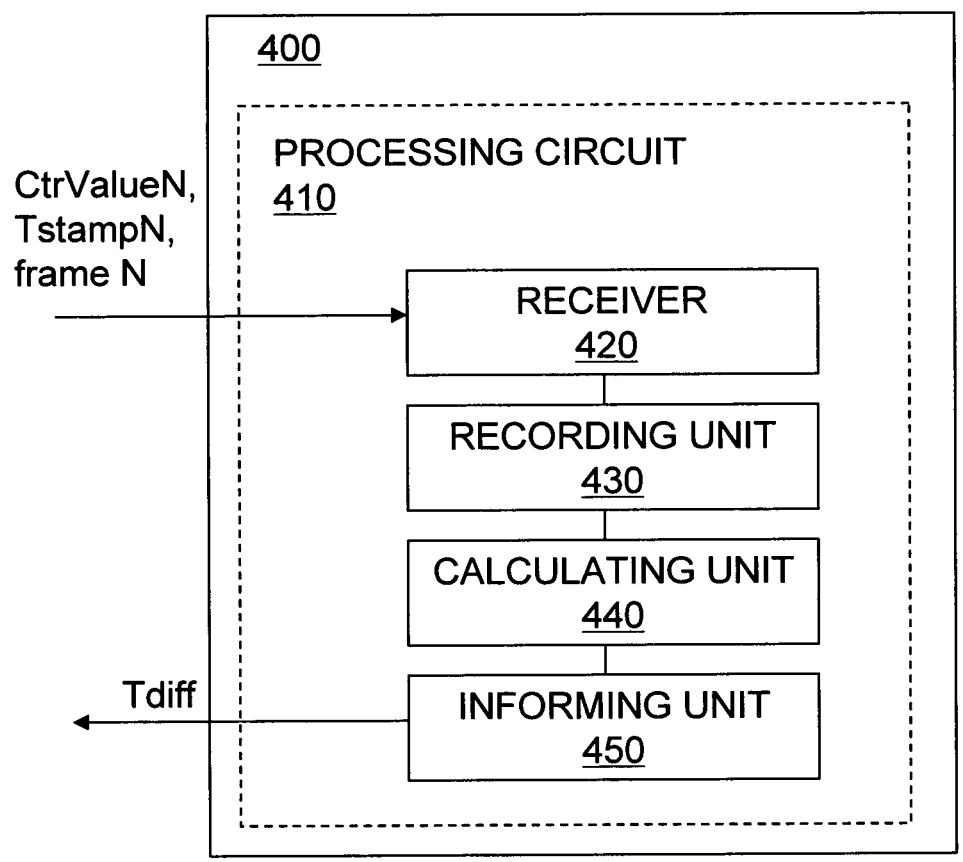
FIG. 4 is a schematic block diagram illustrating an arrangement in an ONU according to an embodiment of the present invention.

To perform the method steps 25-30 in the ONU 15 for time distribution, according to embodiments of the present invention, an arrangement 400 in an ONU 15 adapted to be used in the optical network system 10 is arranged as illustrated in FIG. 4. The arrangement comprises a receiver 420 configured to receive information of the selected time reference frame N, i.e. the actual frame counter value $CtrValue_N$, and the time stamp of the time reference frame from the OLT. The receiver 420 is also configured to receive the time reference frame from the OLT. A recording unit 430 comprised in the arrangement 400 is configured to record the arrival time stamp value of the time reference frame made by the real-time clock of the ONU. Furthermore, the arrangement 400 comprises a calculating unit 440 configured to calculate the time difference between the arrival time stamp value and the received time stamp value of the time reference frame. Additionally, the arrangement comprises an informing unit 450 configured to inform the OLT of the time difference. In one embodiment of the present invention the informing unit 450 is configured to record the time difference in an OMCI MIB. In a further embodiment the informing unit 450 is configured to send an OMCI indication, e.g. an AVC, indicating that the time difference is recorded in the OMCI MIB to the OLT and configured to receive a query of the time difference from the same.

Figure 5:
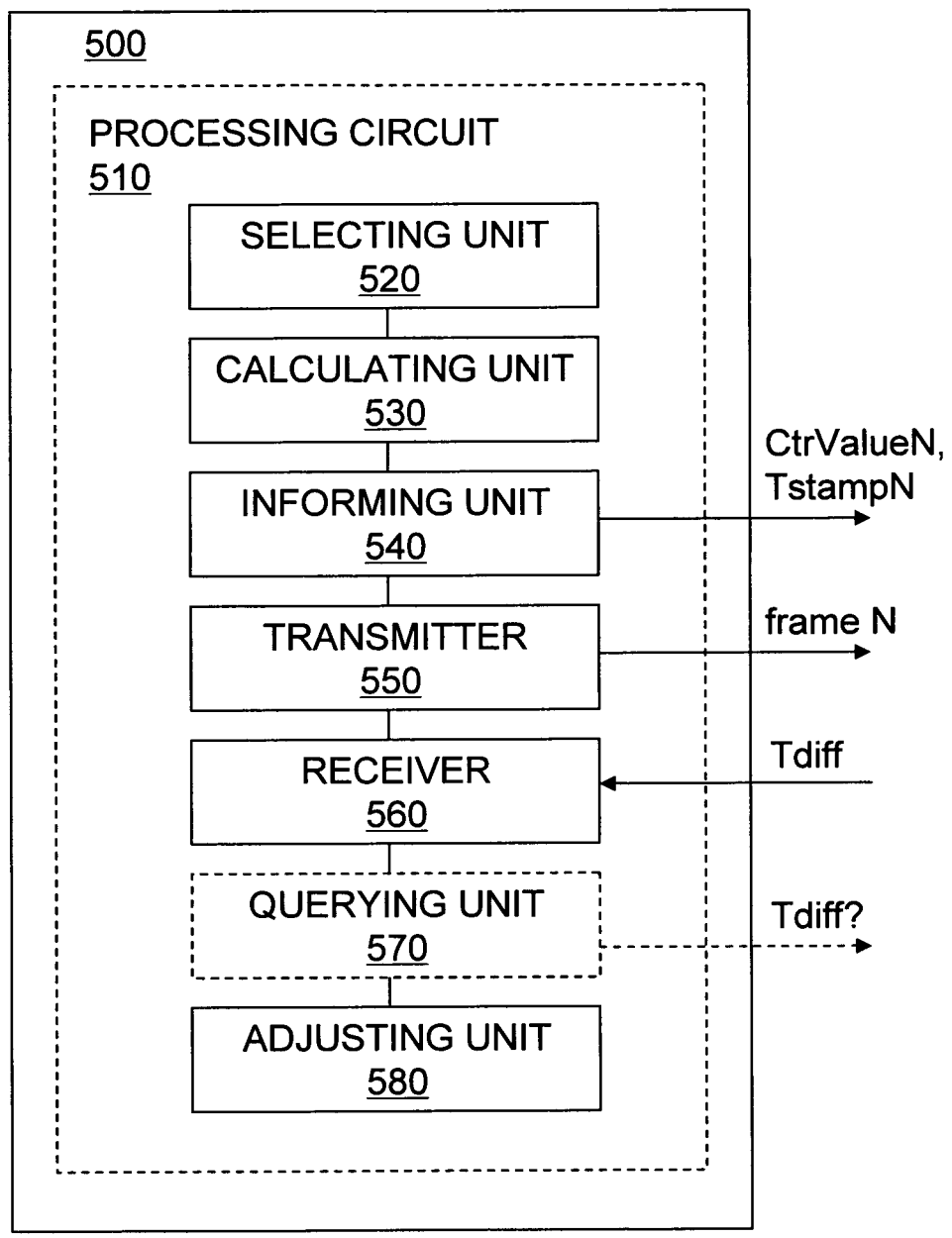
FIG. 5 is a schematic block diagram illustrating an arrangement in an OLT according to embodiments of the present invention.

To perform the method steps 20-26 and 31-32 in the OLT for time distribution, according to embodiments of the present invention, an arrangement 500 in an OLT 13 adapted to be used in the optical network system 10 is arranged as illustrated in FIG. 5. The arrangement 500 comprises a selecting unit 520 configured to select a downstream frame as a time reference frame N. It further comprises a calculating unit 530 configured to calculate the time stamp value of the time reference frame based on the time reference of a real-time clock of the OLT. The arrangement 500 further comprises an informing unit 540 configured to inform the ONU of the time reference frame and the time stamp value. A transmitter 550 configured to send the time reference frame to the ONU is also comprised in the arrangement 500. Furthermore, a receiver 560 configured to receive information of the time difference between the arrival time stamp value of the frame in the ONU made by a real-time clock of the ONU and the time stamp value from the ONU is comprised in the arrangement 500. Additionally, the arrangement 500 comprises an adjusting unit 580 configured to adjust the real-time clock of the OLT based on the received time difference. In one embodiment of the present invention the receiver is configured to receive the OMCI indication, indicating that the time difference is recorded in the OMCI management information base (OMCI MIB). Additionally, the arrangement 500 comprises a querying unit 570 configured to query the OMCI MIB of the time difference.

It should be noted that the units illustrated in FIGS. 4 and 5 may be implemented by physical or logical entities such as processing circuits 410 and 510, using software functioning in conjunction with a programmed microprocessor or a general purpose computer, and/or using an application specific circuit (ASIC).

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in an optical network unit (ONU) for time distribution in an optical network system, wherein the optical network system further comprises an optical line terminal (OLT) the method comprising the steps of:
   receiving information of a selected time reference frame and a time stamp value of the time reference frame from the OLT,
   receiving the time reference frame from the OLT,
   recording an arrival time stamp value of the time reference frame made by a real-time clock of the ONU,
   calculating a time difference between the arrival time stamp value and the received time stamp value of the time reference frame; and
   informing the OLT of the time difference.

2. The method according to claim 1, wherein the step of informing the OLT of the time difference comprises recording the time difference in an optical network terminal management and control interface management information base (OMCI MIB).

3. The method according to claim 1, wherein the step of informing the OLT of the time difference comprises sending an OMCI indication, indicating that the time difference is recorded in OMCI MIB, to the OLT.

4. The method according to claim 1, wherein the step of informing the OLT of the time difference comprises receiving a query of the time difference from the OLT.

5. The method according to claim 1, wherein the real-time clock of the ONU is an internal clock source or an external clock source.

6. The method according to claim 1, wherein the real-time clock of the ONU is a Global Positioning System (GPS) clock.

7. An arrangement in an optical network unit (ONU) for time distribution comprised in an optical network system, the optical network system further comprising an optical line terminal (OLT) the arrangement comprising:
   a receiver configured to receive information of a selected time reference frame and a time stamp of the time reference frame from the OLT,
   a receiver configured to receive the time reference frame from the OLT,
   a recording unit configured to record an arrival time stamp value of the time reference frame made by a real-time clock of the ONU,
   a calculating unit configured to calculate a time difference between the arrival time stamp value and the received time stamp value of the time reference frame; and
   an informing unit configured to inform the OLT of the time difference.

8. The arrangement according to claim 7, wherein the informing unit is configured to record the time difference in an optical network terminal management and control interface management information base (OMCI MIB).

9. The arrangement according to claim 7, wherein the informing unit is configured to send an OMCI indication, indicating that the time difference is recorded in OMCI MIB, to the OLT.

10. The arrangement according to claim 7, wherein the informing unit is configured to receive a query of the time difference from the OLT.

11. The arrangement according to claim 7, wherein the real-time clock of the ONU is an internal clock source or an external clock source.

12. The arrangement according to claim 7, wherein the real-time clock of the ONU is a Global Positioning System (GPS) clock.

13. A method in an optical line terminal (OLT) for time distribution in an optical network system, wherein the optical network system further comprises an optical network unit (ONU) the method comprises the steps of:
   selecting a downstream frame as a time reference frame,
   calculating a time stamp value of the time reference frame based on a time reference of a real-time clock of the OLT,
   informing the ONU of the time reference frame and the time stamp value,
   sending the time reference frame to the ONU,
   receiving information of a time difference between an arrival time stamp value of the frame in the ONU made by a real-time clock of the ONU and the time stamp value from the ONU,
   adjusting the real-time clock of the OLT based on the received time difference.

14. The method according to claim 13, wherein the step of receiving information of the time difference comprises receiving an optical network terminal management and control interface, OMCI indication, indicating that the time difference is recorded in OMCI management information base (MIB).

15. The method according to claim 13, wherein the step of receiving information of the time difference comprises querying a OMCI MIB of the time difference.

16. An arrangement in an optical line terminal (OLT) for time distribution comprised in an optical network system, wherein the optical network system further comprises an optical network unit (ONU) the arrangement comprising:
   a selecting unit configured to select a downstream frame as a time reference frame,
   a calculating unit configured to calculate a time stamp value of the time reference frame based on a time reference of a real-time clock of the OLT,
   an informing unit configured to inform the ONU of the time reference frame and the time stamp value,
   a transmitter configured to send the time reference frame to the ONU,
   a receiver configured to receive information of a time difference between an arrival time stamp value of the frame in the ONU made by a real-time clock of the ONU and the time stamp value from the ONU, and
   an adjusting unit configured to adjust the real-time clock of the OLT based on the received time difference.

17. The arrangement according to claim 16, wherein the receiver is configured to receive an optical network terminal management and control interface, OMCI indication, indicating that the time difference is recorded in OMCI management information base (MIB).

18. The arrangement according to claim 16, further comprises
   a querying unit configured to query a OMCI MIB of the time difference.

* * * * *